United States Patent [19]

Antelman

[11] Patent Number: 5,078,902
[45] Date of Patent: Jan. 7, 1992

[54] DIVALENT SILVER HALIDE BACTERICIDE

[75] Inventor: Marvin S. Antelman, Rehovot, Israel

[73] Assignee: N. Jonas & Co., Inc., Bensalem, Pa.

[21] Appl. No.: 697,783

[22] Filed: May 9, 1991

[51] Int. Cl.$^5$ ............................................... C02F 1/50
[52] U.S. Cl. .................................. 210/764; 210/759; 210/169; 424/601; 424/602; 424/604; 424/618; 514/495; 422/19; 422/28
[58] Field of Search ........................ 210/764, 169, 759; 422/19, 28; 424/618; 514/495

[56] References Cited

U.S. PATENT DOCUMENTS

| | | | |
|---|---|---|---|
| 4,055,655 | 10/1977 | Maurer et al. | 514/495 |
| 4,092,245 | 5/1978 | Franks et al. | 424/618 |
| 5,017,295 | 5/1991 | Antelman | 210/764 |

Primary Examiner—Stanley S. Silverman
Assistant Examiner—Neil M. McCarthy
Attorney, Agent, or Firm—Salter & Michaelson

[57] ABSTRACT

Divalent silver halides provide a source for divalent bactericidal silver ions in the presence of persulfate. The halides are especially effective when applied to water used in industrial cooling installations, hot tubs and swimming pools and will conform to stringent EPA requirements for waters utilized for bathing as in tubs and pools of 100% kills of 100 K/cc *E. Coli* coliforms within 10 minutes, exemplary of which are the chloride and bromide which give 100% kills within 5 minutes. The halides, of course, can be used in salty water since they are solids immune from halide action that would otherwise precipitate soluble divalent silver from solution.

3 Claims, No Drawings

DIVALENT SILVER HALIDE BACTERICIDE

BACKGROUND OF THE INVENTION

The present invention relates to divalent silver (AgII) halide bactericides. The bactericidal properties of soluble Ag(II) compounds is the subject of U.S. Pat. No. 5,017,285 of the present inventor. In said patent the inventor described the preparation of soluble Ag(II) compounds which are effective bactericides in swimming pool and industrial cooling tower waters. These compounds are prepared by dissolving divalent silver oxide, AgO, in certain acids such as phosphoric acid, which form stable Ag(II) complexes. In the course of experimenting with these complexes, it was found that halides precipitated Ag(II) halides from these solutions. It should be noted that the solubility of Ag(II) compounds is totally unrelated to those of Ag(I) in water. For example, Ag(II) sulfate is totally soluble compared to the partially soluble Ag(I) salt. Thus the fact that Ag(II) precipitates halides is not necessarily to be anticipated since the Ag(I) and Ag(II) chemistries are different and distinct despite the fact that they represent dissimilar states of the same element. It was also found that Ag(II) complexes had a greater tolerance for free halide in solution than Ag(I). Accordingly, water sources containing 100 PPM of dissolved sodium chloride (NaCl) would not precipitate insoluble chloride from those solutions which are described in my aforementioned patent. However, water with substantially higher halide content precipitated silver halide.

It was postulated that for those high halide waters, such as sea water used for swimming pools, brackish waters used in cooling towers, swimming pools maintained with calcium chloride for mineralization or mineralized hot tubs, Ag(II) halides could be useful provided they exhibited bactericidal properties since they are already insoluble and will not be prone to precipitation. This was highly desirable since tests conducted in a swimming pool with a high chloride content produced an aesthetically unacceptable curdy white precipitate of chloride when it was treated with an Ag(II) phosphate complex. Of course, since a divalent silver halide is effective and would by necessity have to be produced from a soluble bactericidally active Ag(II) complex, it would not be the first product of choice for low-salt or salt-free water treatment where said soluble Ag(II) complexes were the preferable product. However, there existed the possibility that direct action of a hydrohalic acid on AgO could yield end product Ag(II) halides even though the latter were insoluble. If this were possible, then said Ag(II) halides would be intrinsically competitive with the soluble Ag(II) complexes. Accordingly, it was found that Ag(II) halides are bactericidally active and that they could be prepared both directly and indirectly from AgO.

OBJECT OF THE INVENTION

The primary object of this invention is to provide a source of bactericidally active divalent silver for application to waters utilized for industrial cooling water, swimming pool and hot tub applications which requires 100% kills of a specific standardized bacterium coliform strain within 10 minutes for swimming pools and hot tubs. A further object of this invention is to provide for a source of divalent silver ions which will not precipitate silver halide out of water containing halide salts.

SUMMARY OF THE INVENTION

This invention relates to methods for keeping the water in swimming pools, hot tubs and industrial cooling installations free from bacteria. Said methods relate to bactericidal agent additions of divalent silver halides, especially the chloride, bromide or iodide to said waters.

Divalent silver halides were prepared in the laboratory via various inorganic synthetic routes and were evaluated in the presence of persulfate ion, a known stabilizer for Ag(II) ions, to see whether they were effective at various concentrations in inhibiting bacterial growth. The culture that was chosen for evaluation was $E.\ Coli$, and a test method based on EPA protocol AOAC 15th 1990:965:13 was utilized, which involves a culture of 100 k/cc and requires 100% kills within 10 minutes for a bactericide to quality in swimming pools.

The evaluations were performed in the presence of 10 mg/cc/ potassium monopersulfate utilizing Oxone which is the registered trademark of said compound manufactured by dupont Company.

The silver halides were also added to high salt content water with absolutely no precipitation occurring.

The silver halides were prepared essentially by three routes:
1) Precipitation from divalent silver nitrate solution with an alkaline metal halide;
2) Direct action of a hydrohalic acid with AgO;
3) Direction action of boiling hot alkaline metal halide solution on AgO.

Divalent silver nitrate was prepared by dissolving AgO in nitric acid.

Other objects and features of the present invention will become apparent to those skilled in the art when the present invention is considered in view of the accompanying examples. It should, of course, be recognized that the accompanying examples illustrate preferred embodiments of the present invention and are not intended as a means of defining the limits and scope of the present invention.

DESCRIPTION OF THE PREFERRED EMBODIMENTS

As illustrative of the compositions of this invention are the following:

EXAMPLE I

Divalent silver nitrate was prepared by dissolving AgO containing 1.0 gram of silver for 5 minutes in 30% volume nitric acid (70% of specific gravity 1.42). The dissolution proceeded over a 5-minute period at 75°–80 degrees C. A yellowish brown solution resulted which was immediately diluted with water. The dissolution of AgO in nitric acid is illustrated by the following reaction:

$$AgO + 2HNO_3 = Ag(NO_3)_2 = H_2O$$

The resulting solution was reacted with an aliquot of sodium bromide. Beautiful crystals of divalent silver bromide precipitated from the solution which upon drying gave a yellow-green solid product. The preparation of divalent silver bromide by this route can be represented as follows:

$$Ag(NO_3)_2 + 2\ Nab = AgBr_2 + 2\ NaNO_3$$

When 5.0PPM of Ag(II)Br were added to water containing 10PPM of Oxone which had been adjusted to a pH of 7.5, 100% kills of the aforementioned *E. Coli* coliforms occurred according to the protocol described in the Summary of my invention after 5 and 10 minutes. This represented an actual silver concentration of 1.7 PPM which was effective as a swimming pool and hot tub disinfectant according to EPA protocol.

EXAMPLE II

Two samples of divalent silver chloride were prepared from AgO via alternative routes, the first by reaction of the oxide with a boiling solution of sodium chloride and the second by reaction of the oxide in the cold with concentrated hydrochloric acid. The reactions are respectively:

$$AgO + 2NaCl + H_2O = AgCl_2 + 2 NaOH$$

and $$AgO + 2HCl = AgCl_2 + H_2O$$

Samples of water containing 10PPM of Oxone and adjusted to a pH=7.5 were treated with a 5PPM of divalent silver chloride prepared by both methods. Both samples were submitted to the EPA protocol described in Example I. Both samples gave 100% kills after 5 and 10 minutes. This represented an actual silver concentration of 2.8PPM which was effective as a swimming pool and hot tub disinfectant.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

What is claimed is:

1. A method for controlling the growth of bacteria in the water of swimming pools, hot tubs and industrial cooling towers which comprises adding a divalent silver halide in the presence of an oxidizing agent so as to provide a source of divalent silver ions.

2. A method as claimed in claim 1 where the oxidizing agent is a persulfate.

3. A method according to claim 1 which can be utilized in salt water without causing any precipitation of bactericidally active divalent silver ions.

* * * * *

UNITED STATES PATENT AND TRADEMARK OFFICE
CERTIFICATE OF CORRECTION

PATENT NO.   :   5,078,902
DATED        :   Jan. 7, 1992
INVENTOR(S)  :   Antelman, Marvin S.

It is certified that error appears in the above-identified patent and that said Letters Patent is hereby corrected as shown below:

IN COLUMN 2:

Line 18, change "quality" to --qualify--;

22, change "dupont" to --Dupont--;

30, change "Direction" to --Direct--;

58, before "$H_2O$" (end of line), change " = " to -- + --;

67, change "Nab" (before " = ") to --NaBr--.

Signed and Sealed this

Fifteenth Day of June, 1993

Attest:

MICHAEL K. KIRK

*Attesting Officer*     Acting Commissioner of Patents and Trademarks